United States Patent
Makino

(10) Patent No.: US 10,432,048 B2
(45) Date of Patent: Oct. 1, 2019

(54) SKEWED ROTOR CORES WITH GROOVES FOR REDUCING COGGING TORQUE

(71) Applicant: NTN CORPORATION, Osaka (JP)

(72) Inventor: Yusuke Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/022,283

(22) Filed: Jun. 28, 2018

(65) Prior Publication Data

US 2018/0309333 A1 Oct. 25, 2018

Related U.S. Application Data

(63) Continuation of application No. PCT/JP2017/000095, filed on Jan. 5, 2017.

(30) Foreign Application Priority Data

Jan. 7, 2016 (JP) .................................. 2016-001498

(51) Int. Cl.
*H02K 1/27* (2006.01)
*H02K 1/22* (2006.01)
(Continued)

(52) U.S. Cl.
CPC ............... *H02K 1/276* (2013.01); *H02K 1/22* (2013.01); *H02K 1/27* (2013.01); *H02K 21/14* (2013.01);
(Continued)

(58) Field of Classification Search
CPC ...... H02K 1/276; H02K 1/2773; H02K 1/278; H02K 1/27; H02K 1/2706; H02K 1/2713;
(Continued)

(56) References Cited

U.S. PATENT DOCUMENTS

| 6,876,115 B2 | 4/2005 | Takahashi et al. |
| 9,966,809 B2 | 5/2018 | Ueda |

(Continued)

FOREIGN PATENT DOCUMENTS

| JP | 5-137304 | 6/1993 |
| JP | 2004-248422 | 9/2004 |
| JP | 4003416 | 8/2007 |
| JP | 4490047 | 4/2010 |
| JP | 2014-128116 | 7/2014 |
| WO | 2014/112021 | 7/2014 |

OTHER PUBLICATIONS

International Search Report dated Feb. 14, 2017 in International Patent Application No. PCT/JP2017/000095.
(Continued)

*Primary Examiner* — Julio C. Gonzalez
*Assistant Examiner* — Alexander A Singh

(57) ABSTRACT

The rotating electric motor includes a stator including a stator coil and a stator core, and a rotor located at an inner peripheral side of the stator core and rotatable relative to the stator. The rotor includes a rotor core provided at an outer periphery of a rotor rotation shaft via a core support portion. The rotor core has a plurality of magnetic poles in which a plurality of sets of permanent magnets are provided along a circumferential direction. The rotor core includes a plurality of rotor core divided bodies that are aligned in an axial direction, concentrically arranged, and shifted in phase from each other by a determined angle. A pair of grooves are provided on an outer peripheral portion of each rotor core divided body to be spaced apart from each other in the circumferential direction with a center of each magnetic pole.

2 Claims, 6 Drawing Sheets

(51) Int. Cl.
  *H02K 21/14* (2006.01)
  *B60L 15/00* (2006.01)
  *H02K 29/03* (2006.01)
(52) U.S. Cl.
  CPC .............. *B60L 15/00* (2013.01); *H02K 29/03* (2013.01); *H02K 2201/06* (2013.01); *Y02T 10/641* (2013.01)
(58) Field of Classification Search
  CPC ...... H02K 1/272; H02K 1/2726; H02K 1/274; H02K 1/2746; H02K 1/2753; H02K 1/2766; H02K 16/005; H02K 2201/06; H02K 29/03; H02K 1/22; H02K 21/14; B60L 15/00; Y02T 10/641
  USPC ............ 310/156.47, 156.01, 156.02, 156.08, 310/156.09, 156.33, 156.43, 156.45, 310/156.48, 156.53, 156.56, 156.67, 310/156.68
  See application file for complete search history.

(56) References Cited

U.S. PATENT DOCUMENTS

| | | |
|---|---|---|
| 2004/0164635 A1 | 8/2004 | Takahashi et al. |
| 2008/0224558 A1 | 9/2008 | Ionel |
| 2015/0357892 A1 | 12/2015 | Nakano et al. |
| 2016/0020653 A1* | 1/2016 | Ueda .................... H02K 1/276 310/43 |

OTHER PUBLICATIONS

English Translation by WIPO of the International Preliminary Report on Patentability dated Jul. 19, 2018 in corresponding International Patent Application No. PCT/JP2017/000095, 9 pgs.
Extended and Supplementary Search Report dated Jul. 16, 2019 in related European patent application No. 17 73 5968.4.

* cited by examiner

SKEWED ROTOR CORES WITH GROOVES FOR REDUCING COGGING TORQUE

CROSS REFERENCE TO THE RELATED APPLICATION

This application is a continuation application, under 35 U.S.C. § 111(a), of international application No. PCT/JP2017/000095, filed Jan. 5, 2017, which is based on and claims Convention priority to Japanese patent application No. 2016-001498, filed Jan. 7, 2016, the entire disclosure of which is herein incorporated by reference as a part of this application.

BACKGROUND OF THE INVENTION

Field of the Invention

The present invention relates to a rotating electric motor used for driving a vehicle, for example, and relates to a rotating electric motor that achieves a reduction in cogging torque and also inhibits a decrease in driving torque.

Description of Related Art

For example, a rotor structure provided with a stage skew (Patent Document 1) and a rotor structure provided with a multistage skew (Patent Document 2) for the purpose of reducing cogging torque have been proposed. In addition, a rotor structure (Patent Document 3) for reducing iron loss, torque ripple, and the harmonic wave content ratio of a no-load induced voltage has been proposed.

RELATED DOCUMENT

Patent Document

[Patent Document 1] JP Patent No. 4003416
[Patent Document 2] JP Laid-open Patent Publication No. 2004-248422
[Patent Document 3] JP Patent No. 4490047

An example of an advantageous effect achieved by providing a skew to a rotor or a stator is the reduction of torque pulsation (cogging torque) due to magnetic attraction force acting between permanent magnets of the rotor and the stator. However, there is a possibility that driving torque decreases as skew angle increases.

In Patent Document 1, ½ of an angle obtained by dividing 360° by the lowest common multiple of the number of magnetic poles and the number of slots, that is, an angle that is ½ of the mechanical angle cycle of cogging torque, is defined as a skew angle. With this method, it is possible to reduce cogging torque, but a decrease in driving torque cannot be suppressed.

Whereas Patent Document 1 has proposed an example of a two-stage skew, Patent Document 2 has proposed that cogging torque can be reduced using a multistage skew by defining the skew angle θ=360°/([lowest common multiple of number of magnetic poles and number of slots]×n) (n is the number of stages). However, this is not considered sufficient in terms of inhibition of a decrease in driving torque. In Patent Document 3, torque ripple and the harmonic wave content ratio of a no-load induced voltage are reduced, but inhibition of a decrease in driving torque in the case where a skew is provided to a rotor is not taken into consideration.

SUMMARY OF THE INVENTION

An object of the present invention is to provide a rotating electric motor that can achieve a reduction in cogging torque and can inhibit a decrease in driving torque.

A rotating electric motor of the present invention is a rotating electric motor including: a stator including a stator coil and a stator core provided annularly; and a rotor located at an inner peripheral side or radially inwardly of the stator core and rotatable relative to the stator, the rotor including a rotor core provided at an outer periphery of a rotor rotation shaft via a core support portion, the rotor core having a plurality of magnetic poles in which a plurality of sets of permanent magnets are provided along a circumferential direction, wherein the rotor core includes a plurality of rotor core divided bodies that are aligned in an axial direction, that are concentrically arranged, and that are shifted in phase from each other by a determined angle, and a pair of grooves are provided on an outer peripheral portion of each rotor core divided body so as to be spaced apart from each other in the circumferential direction with respect to a center of each magnetic pole.

The determined angle is the mechanical relative angle of the plurality of rotor core divided bodies. The mechanical relative angle is referred to as "mechanical angle". The determined angle is determined on the basis of the results of one of or both a test and a simulation.

Cogging torque is generated due to magnetic attraction force acting between the permanent magnets of the rotor and the stator. According to this configuration, the plurality of rotor core divided bodies aligned in the axial direction and concentrically arranged are arranged so as to be shifted in phase from each other, that is, a skew is provided to the rotor. Thus, a reduction in cogging torque can be achieved. Even in the case where a skew is provided to the rotor as described above, since the pair of grooves are provided on the outer peripheral portion of each rotor core divided body, the electrical angle cycle of cogging torque can apparently or seemingly become half of the electrical angle cycle of cogging torque generated when no skew is provided to the rotor.

Accordingly, an optimum skew angle (at which the effect of reducing cogging torque is high) can be smaller than that in the case where a skew is provided to the rotor and no groove is provided on the outer peripheral portion of each rotor core divided body. Driving torque decreases as the skew angle increases. Thus, by making the optimum skew angle smaller as described above, a decrease in driving torque of the rotating electric motor can be suppressed.

The pair of grooves may be arranged so as to be symmetrical with respect to the center of each magnetic pole. The pair of grooves being "symmetrical" is synonymous with the pair of grooves having symmetrical shapes and being arranged such that the angles of these grooves from the center of each magnetic pole are opposite to each other and have the same magnitude. In this case, a reduction in cogging torque is achieved, and the effect that a decrease in driving torque can be suppressed is more reliably obtained.

A skew angle obtained by multiplying the determined angle by the number of the magnetic poles may be set to ¼ of an electrical angle cycle of cogging torque. In this case, cogging torque is the smallest, and a decrease in driving torque is small.

Each groove may have a deepest point provided within a range of an angle θa formed by a rotation center of the rotor and both ends, in the circumferential direction, of the permanent magnets that form each magnetic pole, and an angle θb between the deepest point of each groove and the ends, in the circumferential direction, of the permanent magnet may be in the range equal to or greater than 3° and less than 5°, as an electrical angle, between which cogging torque is not greater than a specified value. The specified value is determined on the basis of the results of one of or both a test and a simulation. According to this configuration, by providing each groove so as to fall within the above angle range, cogging torque can reliably be not greater than the specified value.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A rotating electric motor according to an embodiment of the present invention will be described with reference to FIGS. 1 to 7. The rotating electric motor is used for driving an automobile, for example. An outer side of an automobile in the width direction of the automobile, in a state where the electric motor is mounted to the automobile such that a rotation shaft of a motor rotor is orthogonal to a direction of travel, is referred to as outboard side, and a side of the automobile close to the center in the width direction of the automobile in this state is referred to as inboard side.

Figure 1:
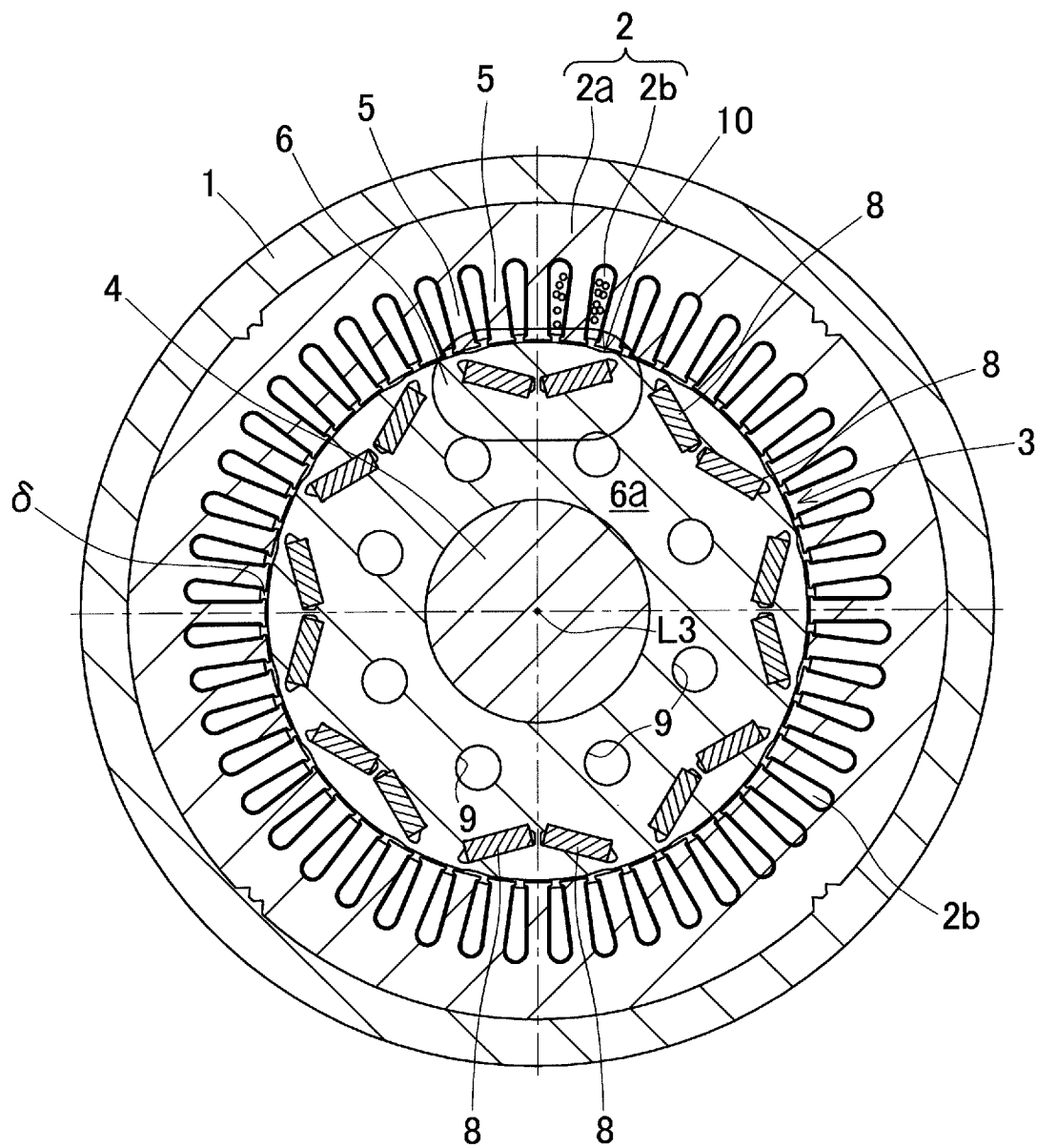
FIG. 1 is a cross-sectional view of a rotating electric motor according to an embodiment of the present invention.

FIG. 1 is a cross-sectional view of the rotating electric motor, and is a cross-sectional view taken along a line I-I in FIG. 2 described later. As shown in FIG. 1, the rotating electric motor includes a housing 1, a stator 2, and a rotor 3. The rotating electric motor is a so-called radial gap type IPM motor (interior permanent magnet synchronous motor) in which an annular gap δ (FIG. 2) is provided between the rotor 3 and the stator 2 fixed within the housing 1.

Figure 2:
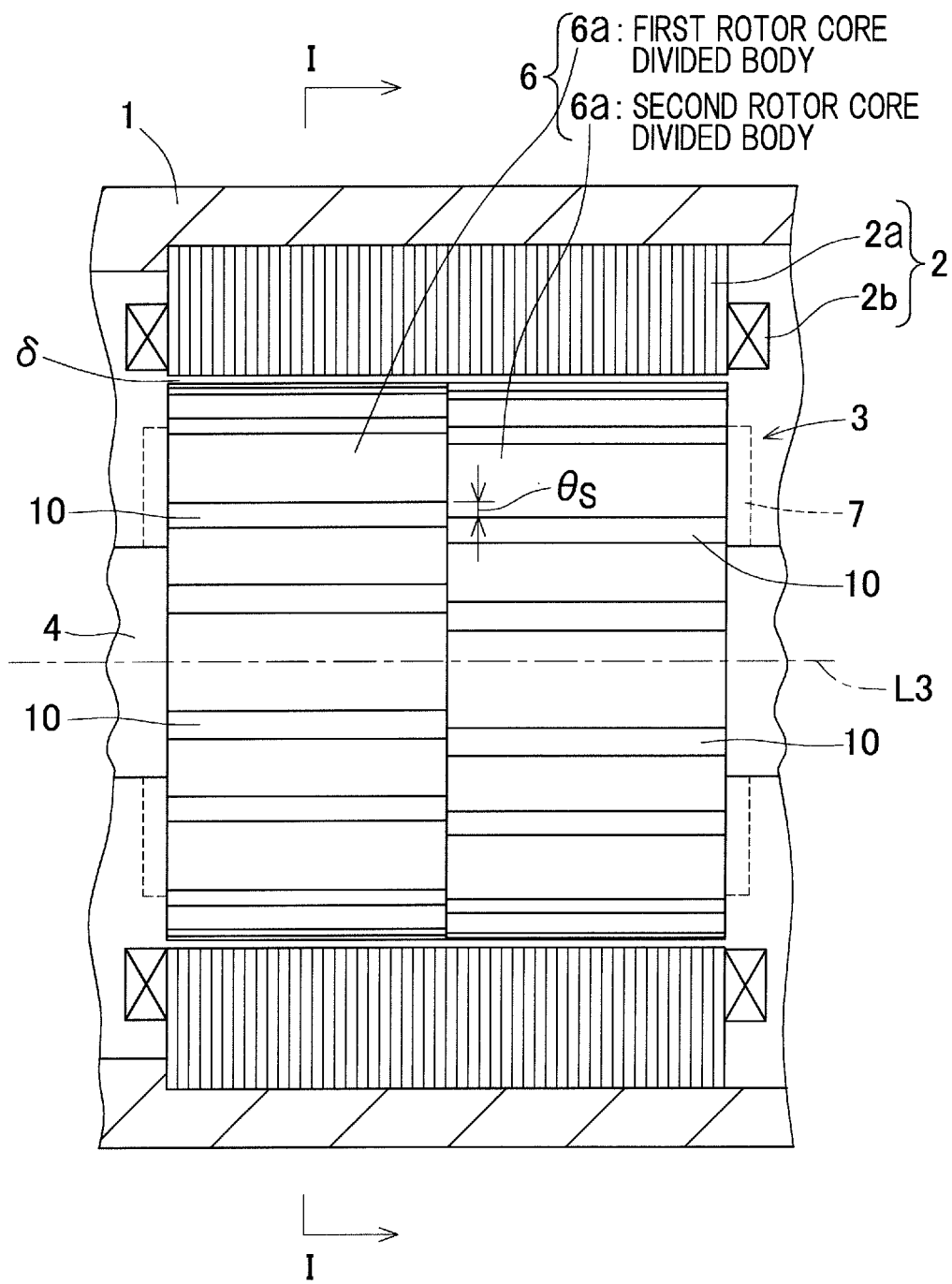
FIG. 2 is a diagram showing a stage skew, etc. of a rotor core of the rotating electric motor.

As shown in FIG. 2, the stator 2 and a major part of the rotor 3 are provided within the housing 1 that has a cylindrical shape, for example. Bearings that are not shown are provided at one end portion and the opposite end portion, in the axial direction, of the housing 1 and concentrically arranged. A rotor rotation shaft 4 of the rotor 3 is rotatably supported by the bearings provided on the housing 1. The outboard-side end of the rotor rotation shaft 4 projects in the axial direction from the housing 1 and is connected to a speed reducer, or reduction gear, or the like that is not shown.

As shown in FIG. 1, the stator 2 includes a stator core 2a formed from a soft magnetic material, and a stator coil 2b wound on the stator core 2a. The stator core 2a has an annular shape with an outer peripheral surface having a circular cross-sectional shape, and a plurality of teeth 5 (48 teeth 5 in this example) are formed on the inner peripheral surface of the stator core 2a so as to be aligned in the circumferential direction and project at the inner diameter side. The stator coil 2b is wound on each tooth 5. The winding type of the stator coil 2b is, for example, distributed winding. The outer peripheral surface of the stator core 2a is fitted and fixed to the inner peripheral surface of the housing 1.

As shown in FIG. 2, the rotor 3 is disposed at the inner peripheral side or radially inwardly of the stator core 2a. The rotor 3 includes a rotor core 6 provided at the inner periphery of the stator core 2a with the annular gap S therebetween, a core support portion 7, and the rotor rotation shaft 4. The rotor core 6 is provided at the outer periphery of the rotor rotation shaft 4 via the core support portion 7. The rotor core 6 and the rotor rotation shaft 4 are coupled to each other by the core support portion 7 so as to rotate integrally.

As shown in FIG. 1, the rotor core 6 has a plurality of magnetic poles (the number of the magnetic poles is "8" in this example) in which a plurality of sets of permanent magnets 8 are provided along the circumferential direction. The plurality of sets of permanent magnets 8 are embedded in the rotor core 6 and arranged at regular intervals in the circumferential direction. For example, neodymium magnets are used as the permanent magnets 8. When each set of permanent magnets 8 are taken along a plane perpendicular to the rotor axis and seen, the permanent magnets 8 adjacent to each other in the circumferential direction are arranged so as to oppose each other in a V cross-sectional shape. Accordingly, reluctance torque having a desired magnitude can be generated.

As shown in FIG. 2, the rotor core 6 includes a plurality of rotor core divided bodies 6a (two rotor core divided bodies 6a in this example). These rotor core divided bodies 6a are aligned in the axial direction and concentrically arranged so as to be shifted in phase from each other by a determined angle θs. Here, the rotor core divided body 6a at one side in the axial direction is referred to as first rotor core divided body 6a, and the rotor core divided body 6a at the other side in the axial direction is referred to as second rotor core divided body 6a. The determined angle θs is the mechanical relative angle of the first and second rotor core divided bodies 6a. The mechanical relative angle is referred to as "mechanical angle".

The rotor core 6 having the first and second rotor core divided bodies 6a arranged with the phase difference θs as described above is referred to as rotor core 6 with a two-stage skew. The determined angle θs is determined on the basis of the results of one of or both a test and a simulation. The first and second rotor core divided bodies 6a respectively have a plurality of through holes 9 formed at regular intervals in the circumferential direction so as to extend in the axial direction as shown in FIG. 1, for connecting the first and second rotor core divided bodies 6a to each other with the phase difference θs by means of bolts or the like that are not shown.

Figure 3:
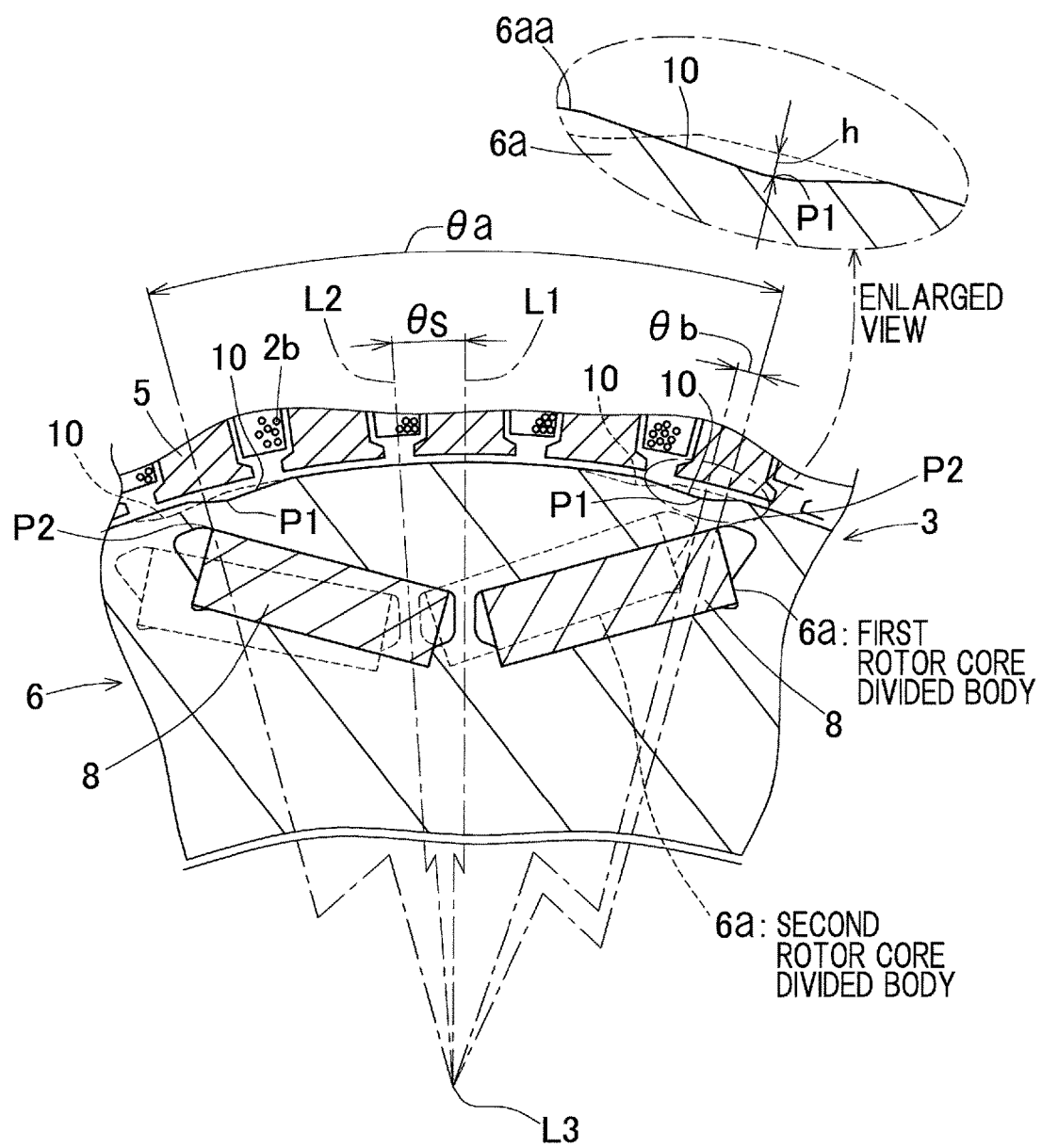
FIG. 3 is a cross-sectional view showing the positional relationship between the rotor core, permanent magnets, and grooves of the rotating electric motor.

FIG. 3 is a cross-sectional view, as seen in the rotor axial direction, showing the positional relationship between the rotor core 6, the permanent magnets 8, and grooves 10 of the rotating electric motor. In FIG. 3, solid lines indicate the first rotor core divided body 6a, and broken lines indicate the second rotor core divided body 6a. The first and second rotor core divided bodies 6a are concentrically connected to each other such that the center L1 of each magnetic pole in the first rotor core divided body 6a and the center L2 of each magnetic pole in the second rotor core divided body 6a have the phase difference θs. The center L1 or L2 of each magnetic pole is represented by a line connecting the midpoint between the two permanent magnets in a V cross-sectional shape, adjacent to each other in the circumferential direction, and the rotor axis, that is, the rotation center (rotor axis) L3 of the rotor 3, when each set of permanent magnets 8 are taken along a plane perpendicular to the rotor axis L3 and seen.

A pair of grooves 10 are provided on an outer peripheral portion of each rotor core divided body 6a so as to be spaced apart from each other in the circumferential direction with respect to the center L1 or L2 of each magnetic pole. The pair of grooves 10 are arranged so as to be symmetrical with respect to the center L1 or L2 of each magnetic pole. The pair of grooves 10 being symmetrical is synonymous with the pair of grooves 10 having symmetrical shapes and being arranged such that the angles of these grooves 10 from the center L1 or L2 of each magnetic pole are opposite to each other and have the same magnitude.

Each groove 10 is formed on the outer peripheral portion of the rotor core divided body 6a so as to be recessed in a substantially V shape radially inward from the other portion which forms a circle or an arc. In addition, each groove 10 extends along the axial direction as shown in FIG. 2. Since the first and second rotor core divided bodies 6a are arranged with the phase difference θs as described above, the grooves 10 of the first and second rotor core divided bodies 6a that are adjacent to each other in the axial direction also have the phase difference θs.

As shown in FIG. 3, the deepest point P1 (the bottommost part recessed in the substantially V shape) of each groove 10 is provided within the range of an angle θa. The angle θa is the angle formed by the rotation center L3 of the rotor 3 and opposite ends P2, in the circumferential direction and at the outer peripheral side, of the permanent magnets 8 that form each magnetic pole, and is also referred to as "pole arc angle". The angle θb between the deepest point P1 of each groove 10 and the end P2, in the circumferential direction, of the permanent magnet 8 is an electrical angle, and is in the range equal to or greater than 3° and less than 5° in which range cogging torque is not greater than a specified value. Cogging torque tends to increase as the depth h, in the radial direction, of the deepest point P1, with respect to an outer peripheral surface 6aa of the rotor core divided body 6a, increases. Thus, the depth h, in the radial direction, of the deepest point P1 is preferably not greater than 0.5 mm. For example, the depth h, in the radial direction, of the deepest point P1 is set to 0.3 mm to 0.4 mm, but is not limited to this example.

Meanwhile, cogging torque is generated due to magnetic attraction force acting between permanent magnets of a rotor and a stator, and the mechanical angle cycle of the cogging torque is 360°/(lowest common multiple of number of magnetic poles and number of slots). The electrical angle cycle of the cogging torque is 360×(number of magnetic poles)/(lowest common multiple of number of magnetic poles and number of slots). In the present embodiment, since the number of magnetic poles is "8" and the number of slots is "48", the lowest common multiple of the number of magnetic poles and the number of slots is "48".

Figure 8:
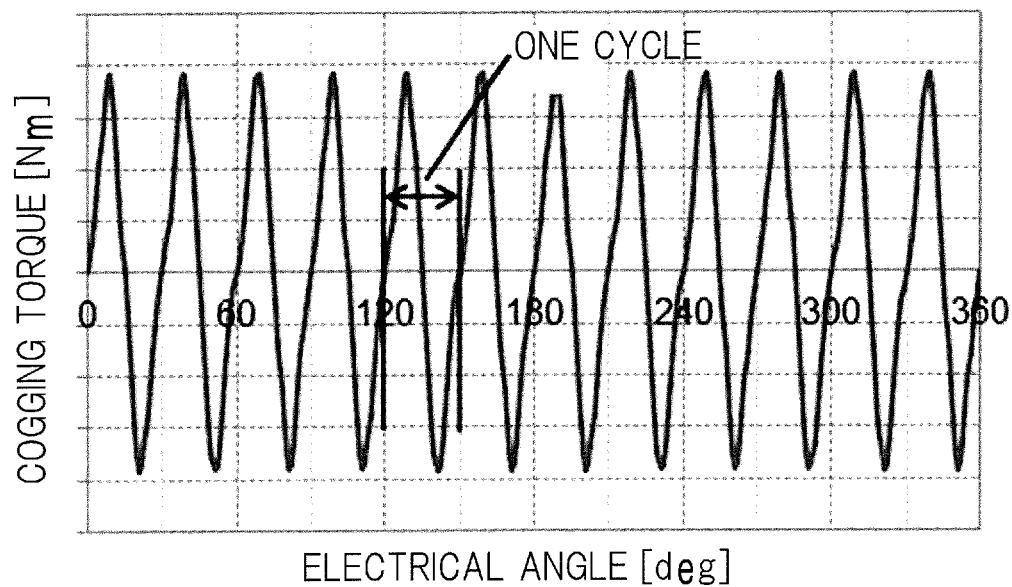
FIG. 8 is a diagram showing the waveform of cogging torque generated in a rotating electric motor according to a proposed reference example when no stage skew is provided to a rotor core.
Figure 9:
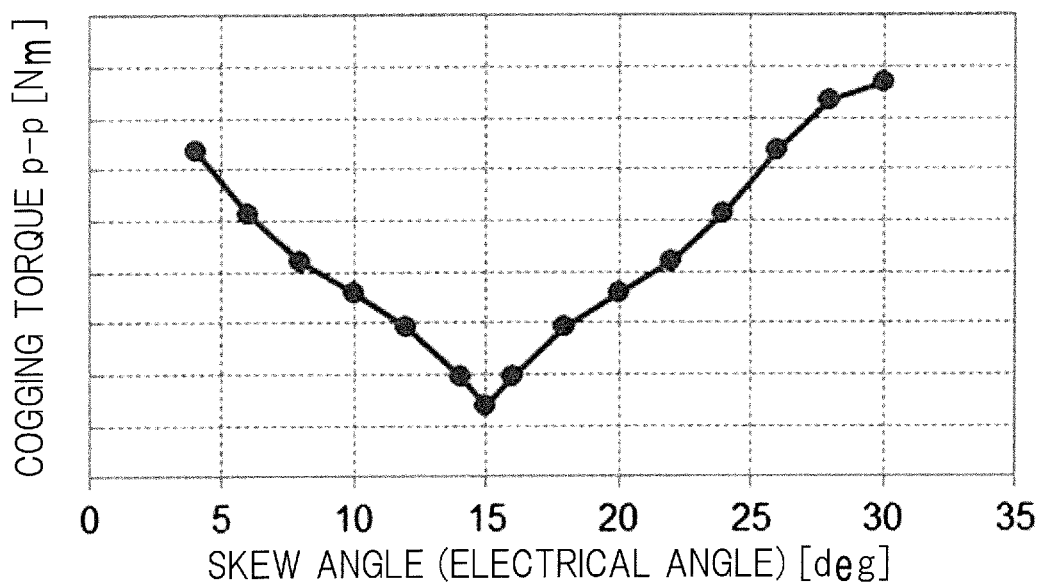
FIG. 9 is a diagram showing the relationship between a skew angle and cogging torque in the rotating electric motor according to the proposed reference example when no groove is provided on an outer peripheral portion of a rotor.

FIG. 8 is a diagram showing the waveform of cogging torque generated in a rotating electric motor according to a proposed reference example when no stage skew is provided to a rotor core. As shown in FIG. 8, the electrical angle cycle of the cogging torque generated when no stage skew is provided to the rotor core is 30°. In this case, an optimum skew angle (electrical angle) at which cogging torque can be suppressed is 15°, as an electrical angle, which is ½ of the electrical angle cycle of the cogging torque, as shown in FIG. 9.

Figure 4:
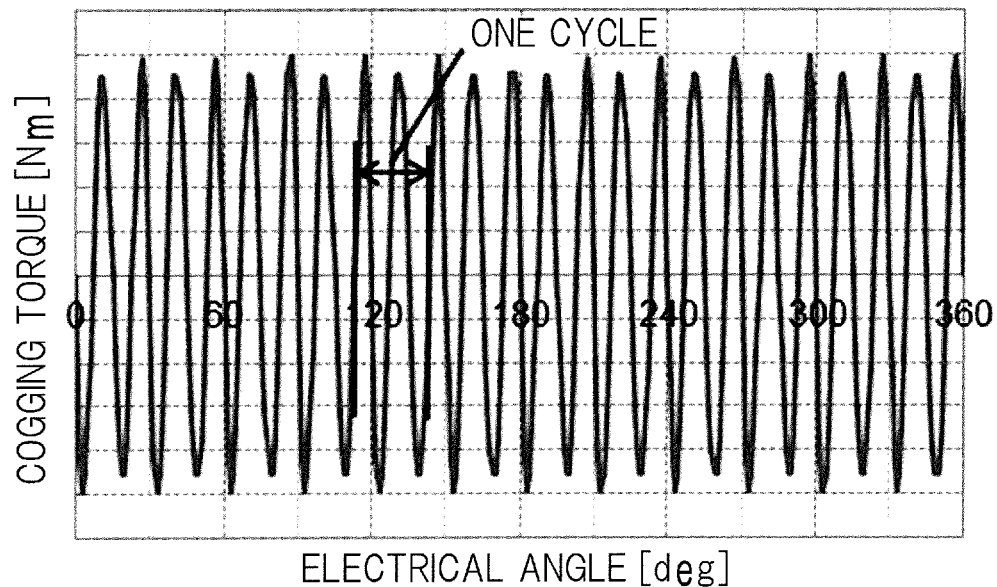
FIG. 4 is a diagram showing the waveform of cogging torque of the rotating electric motor.
Figure 5:
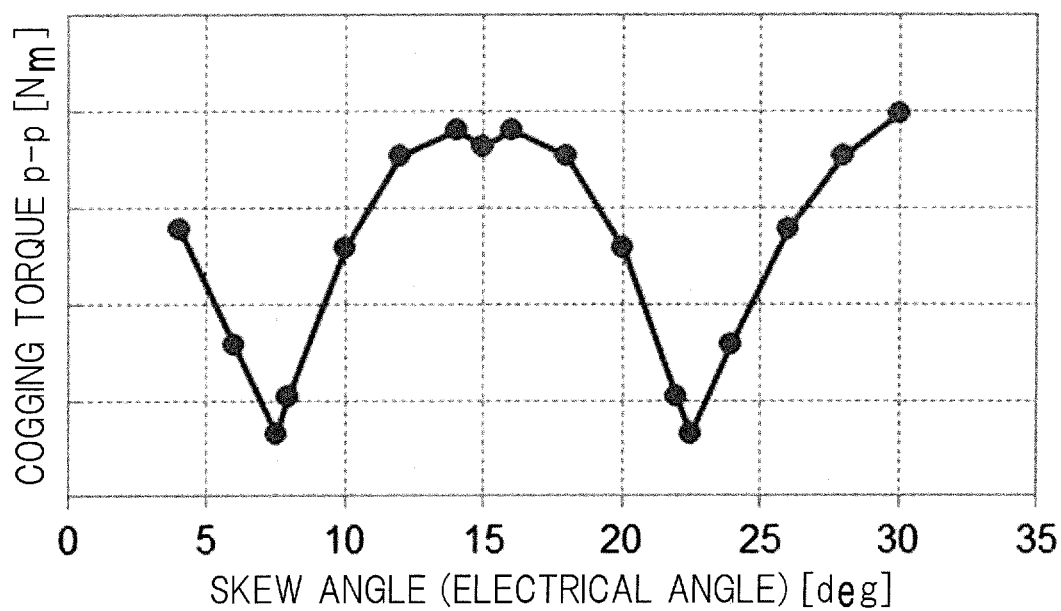
FIG. 5 is a diagram showing the relationship between a skew angle and cogging torque of the rotating electric motor.

On the other hand, in the rotating electric motor according to the present embodiment, by providing a pair of grooves 10 on the outer peripheral portion of each rotor core divided body 6a as shown in FIG. 3, the cycle of cogging torque can apparently or seemingly be 15° as an electrical angle as shown in FIG. 4. In this case, an optimum skew angle at which cogging torque can be suppressed can be 7.5°, as an electrical angle, which is ¼ of the electrical angle cycle of the cogging torque, as shown in FIG. 5.

Figure 7:
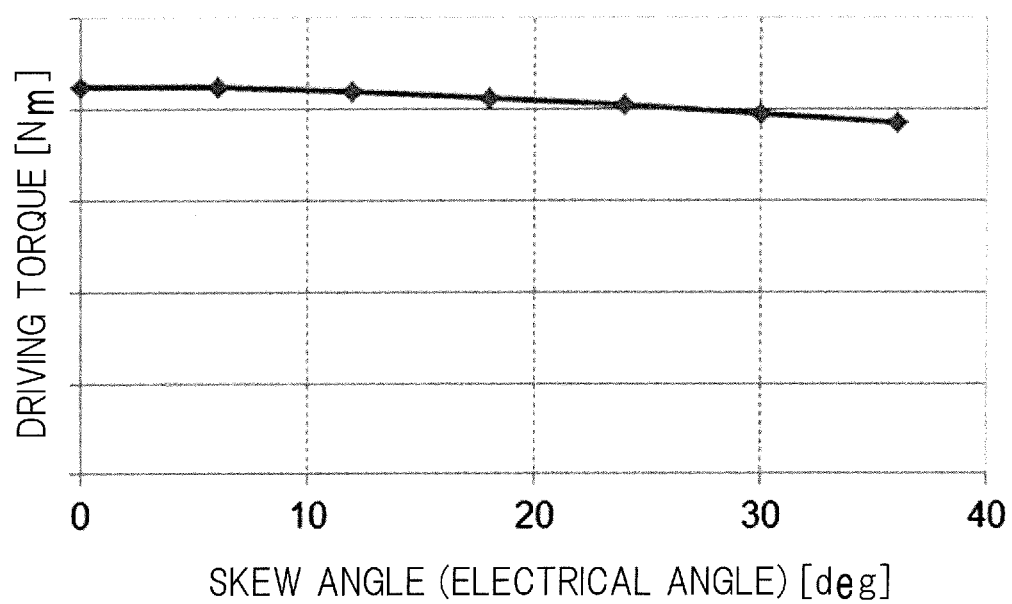
FIG. 7 is a diagram showing the relationship between the skew angle and driving torque of the rotating electric motor.

In the rotating electric motor of the present embodiment, the optimum skew angle at which cogging torque can be suppressed can be smaller than that in the proposed reference example. As shown in FIG. 7, driving torque decreases as the skew angle increases. Thus, by making the skew angle smaller as described above, a decrease in driving torque due to the provision of the stage skew to the rotor core can be suppressed.

Figure 6:
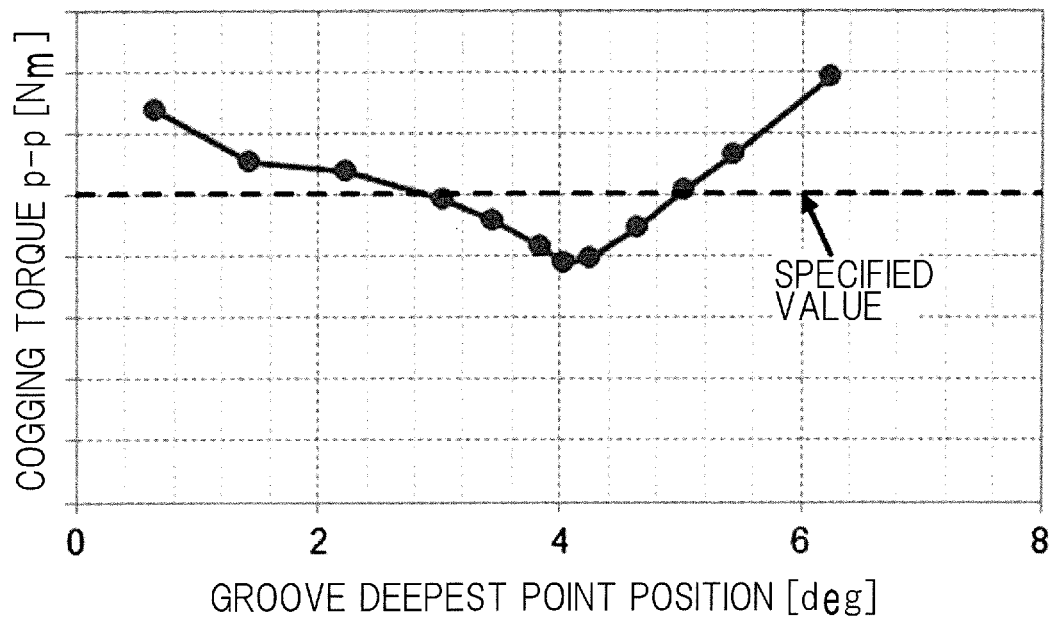
FIG. 6 is a diagram showing the relationship between the position of the deepest point of each groove and cogging torque of the rotating electric motor.

As shown in FIG. 3 and FIG. 6, cogging torque can be reliably not greater than the specified value when the deepest point P1 of each groove 10 falls within the range of the pole arc angle θa, and when the angle θb between the deepest point P1 of each groove 10 and the opposite ends P2, in the circumferential direction, of the permanent magnet 8 is in the range equal to or greater than 3° and less than 5°, as an electrical angle, between which cogging torque is not greater than the specified value. Since the pair of grooves 10 are arranged so as to be symmetrical with respect to the center L1 or L2 of each magnetic pole, a reduction in cogging torque is achieved, and the effect that a decrease in driving torque can be suppressed is more reliably obtained.

Other embodiments will be described. In the above embodiment, the rotor with the two-stage skew has been described, but a multistage skew may be provided. However, a two-stage skew is preferable since its effect of inhibiting a decrease in driving torque is the largest. The winding type of the stator coil may be concentrated winding. Components other than the two permanent magnets opposed and adjacent to each other in a V cross-sectional shape may be disposed in the rotor core.

Although the preferred modes for carrying out the present invention have been described on the basis of the embodiments with reference to the accompanying drawings, the embodiments disclosed herein are illustrative in all aspects and not restrictive. The scope of the present invention is indicated by the claims, rather than by the above description. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . stator
2a . . . stator core
2b . . . stator coil
3 . . . rotor
4 . . . rotor rotation shaft
6 . . . rotor core
6a . . . first and second rotor core divided bodies
7 . . . core support portion
8 . . . permanent magnet
10 . . . groove
P1 . . . deepest point

What is claimed is:

1. A rotating electric motor comprising:
a stator including a stator coil and a stator core provided annularly; and
a rotor located at an inner peripheral side of the stator core and rotatable relative to the stator, the rotor including a rotor core provided at an outer periphery of a rotor rotation shaft via a core support portion, the rotor core having a plurality of magnetic poles in which a plurality of sets of permanent magnets are provided along a circumferential direction, wherein
the rotor core includes a plurality of rotor core divided bodies that are aligned in an axial direction, that are concentrically arranged, and that are shifted in phase from each other by a determined angle, and a pair of grooves are provided on an outer peripheral portion of each rotor core divided body so as to be spaced apart from each other in the circumferential direction with respect to a center of each magnetic pole,
wherein each groove has a deepest point provided within a range of an angle θa formed by a rotation center of the rotor and both corner ends, in the circumferential direction, of the permanent magnets that form each magnetic pole, and wherein an angle θb between the deepest point of each groove and the corner ends, in the circumferential direction, of the permanent magnet is in the range equal to or greater than 3° and less than 5°, as an electrical angle, between which cogging torque is not greater than a specified value.

2. The rotating electric motor as claimed in claim 1, wherein the pair of grooves are arranged so as to be symmetrical with respect to the center of each magnetic pole.

* * * * *